(12) United States Patent
Babej

(10) Patent No.: US 7,657,987 B2
(45) Date of Patent: *Feb. 9, 2010

(54) METHODS FOR THE ATTACHMENT OF A FUNCTIONAL ELEMENT TO A SHEET METAL PART

(75) Inventor: Jiri Babej, Lich (DE)

(73) Assignee: Profil Verbindungstechnik GmbH & Co., KG, Friedrichsdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/055,914

(22) Filed: Mar. 26, 2008

(65) Prior Publication Data

US 2008/0189929 A1     Aug. 14, 2008

Related U.S. Application Data

(62) Division of application No. 10/472,648, filed as application No. PCT/EP02/03187 on Mar. 21, 2002, now Pat. No. 7,367,767.

(30) Foreign Application Priority Data

Mar. 23, 2001   (DE) ................. 101 14 200

(51) Int. Cl.
    *B23P 11/00*   (2006.01)
    *F16B 37/04*   (2006.01)
(52) U.S. Cl. ............... 29/432.1; 29/432.2; 29/524.1; 29/525.06; 29/798; 411/181; 403/282; 403/283; 403/285

(58) Field of Classification Search ............. 29/432, 29/432.1, 432.2, 509, 524.1, 525.05, 525.06, 29/798, 243.53; 403/282, 283, 285; 411/172, 411/173, 174, 175, 176, 177, 179, 180, 181, 411/182, 183; 72/463, 470

See application file for complete search history.

(56) References Cited

U.S. PATENT DOCUMENTS 2,255,964 A * 9/1941 Blaho ............... 220/601
3,014,609 A * 12/1961 Hobbs ............... 29/509

(Continued)

FOREIGN PATENT DOCUMENTS

DE       34 47 006      7/1985

(Continued)

*Primary Examiner*—Jermie E Cozart
(74) *Attorney, Agent, or Firm*—Hershkovitz & Associates, LLC; Abraham Hershkovitz; Eugene C. Rzucidlo

(57) ABSTRACT

A functional element for connection to a sheet metal part, and a method for connecting a functional element to a sheet metal part. The functional element includes a head part, a tubular rivet section extending from the head part and a tubular guide section disposed within the rivet section, with a portion of the guide section extending beyond the open end of the rivet section. When the sheet metal part is pre-holed, the portion of the guide section extending beyond the rivet section serves to dilate the pre-cut hole while centering the rivet section, and the functional element includes security components to provide an enhanced and stable connection as well as to secure against rotation. The guide section can be configured as a self-piercing component for use with a sheet metal part that is not pre-holed.

3 Claims, 10 Drawing Sheets

U.S. PATENT DOCUMENTS

| | | | |
|---|---|---|---|
| 3,314,138 A | | 4/1967 | Double |
| 5,006,025 A | * | 4/1991 | Duran ........................ 411/183 |
| 5,528,812 A | | 6/1996 | Muller |
| 5,673,472 A | * | 10/1997 | Muller ...................... 29/432.1 |
| 6,560,819 B2 | * | 5/2003 | Mizuno et al. ................. 16/2.2 |
| 6,604,900 B2 | * | 8/2003 | Ikami et al. .................. 411/181 |

FOREIGN PATENT DOCUMENTS

| | | |
|---|---|---|
| DE | 34 46 978 | 8/1985 |
| DE | 196 09 252 | 1/1997 |
| EP | 0 539 793 | 12/1996 |
| GB | 2 180 905 | 4/1987 |

* cited by examiner

Fig. 13
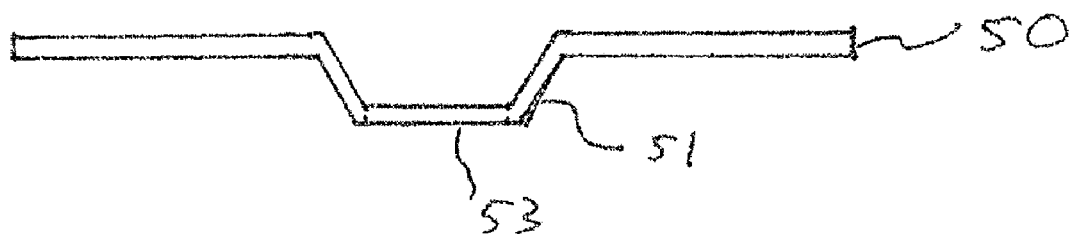
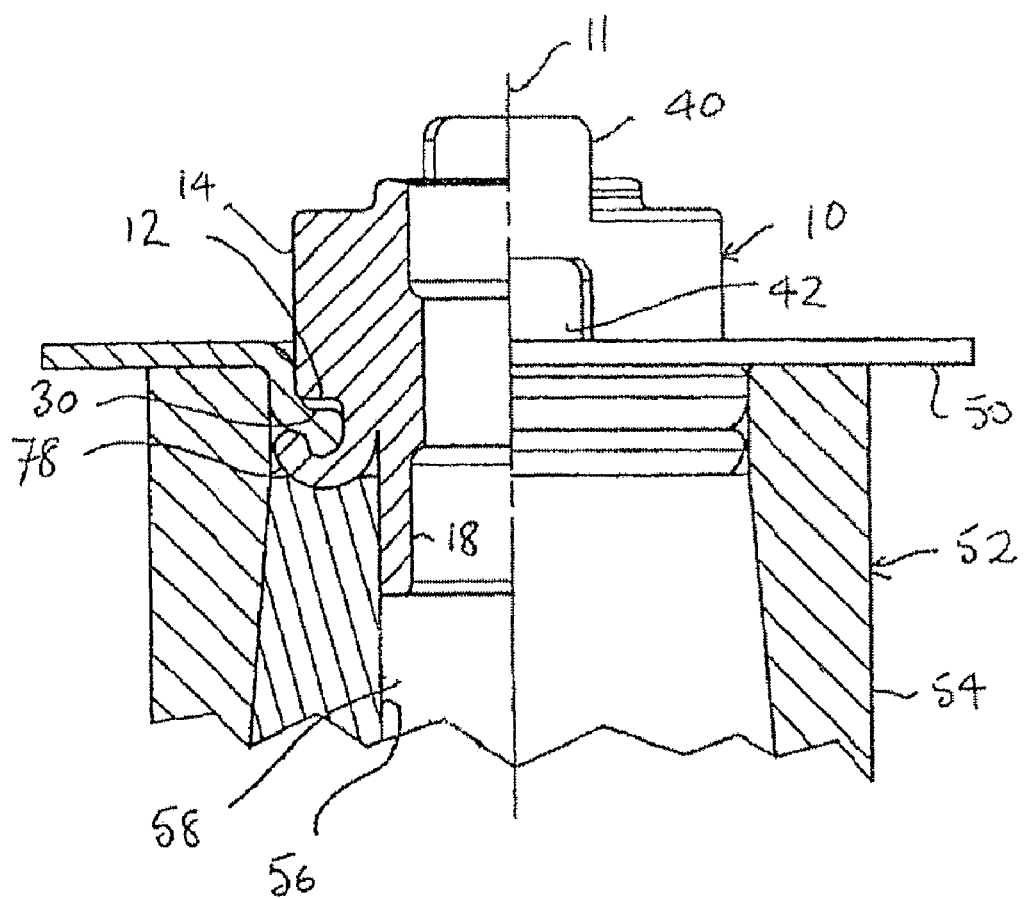
Fig. 12

METHODS FOR THE ATTACHMENT OF A FUNCTIONAL ELEMENT TO A SHEET METAL PART

CROSS REFERENCE TO RELATED APPLICATIONS

This application is a divisional application of U.S. patent application Ser. No. 10/472,648 filed on Mar. 30, 2004 which claims priority to PCT/EP02/03187 filed on Mar. 21, 2002 which claims priority to German Application No. 101 14 200.5 filed Mar. 23, 2001.

FIELD OF THE INVENTION

The present invention relates to a functional element having a head part with a ring-like contact surface and a tubular rivet section provided at the side of a contact surface of the head part and extending away from the head part. Furthermore, the invention relates to a component assembly comprising a sheet metal part and a functional element of this kind as well as to a method for the attachment of a functional element of this kind to a sheet metal part.

BACKGROUND OF THE INVENTION

A functional element of the initially named kind is, for example, known from EP-A-539743 and indeed both in the form of a nut element and also in the form of a bolt element.

Neither the nut element nor the bolt element of EP-A-539793 can be introduced in self-piercing manner into the sheet metal part but rather the sheet metal part must be pre-holed. Furthermore, the sheet metal preparation in EP-A-539793 includes the production of an axially projecting ring lip in the sheet metal part which bounds an opening into which the rivet section of the functional element must be inserted. In this operation the ring lip projects from the side of the sheet metal part from which the functional element is introduced. The projecting lip with the pre-manufactured opening signifies in practice, that the functional element must be aligned with high accuracy with respect to the sheet metal part in order to ensure the orderly attachment of the functional element.

The object of the present invention is to provide a functional element and also a method for the attachment of the functional element to a sheet metal part which enables a favorably priced attachment of the functional element to a sheet metal part, without placing particular demands on the alignment of the functional element with the component, with the requirements for any eventually necessary preparation of the sheet metal part not being very high and with a high quality connection between the functional element and the sheet metal part nevertheless being achieved. Furthermore, a self-piercing embodiment of the element should be possible, if desired, and, in addition, a connection between the functional element and the sheet metal part should come about which enables an electrically conductive connection, even with coated metal sheets.

BRIEF DESCRIPTION OF THE INVENTION

In order to satisfy this object there is provided, in accordance with the invention, a functional element of the initially named kind, which is characterized in that a tubular guide section is arranged concentric to the tubular rivet section and radially within the latter, with a ring gap being provided between the guide section (18) and the rivet section and with the guide section projecting beyond the free end of the rivet section. Furthermore, a component assembly is provided in accordance with the invention as well as methods for the attachment of a functional element.

Because a tubular guide section is arranged concentric to the tubular rivet section and radially within the latter, with the guide section projecting beyond the second end of the rivet section, attention is paid in accordance with the invention, when using the functional element with a pre-holed metal sheet, that the guide section moves into the hole of the pre-holed metal sheet and serves, if necessary while dilating the hole, for a centering of the functional element relative to the pre-manufactured hole or relative to the dilated prepared hole. Since the guide process takes place prior to the subsequent dilation of the hole by the rivet section and the subsequent turning over of the rivet section, it is also ensured that a high quality connection always arises between the functional element and the sheet metal part.

For the pre-holing of the sheet metal part this pre-holing can also be effected in such a way that no projecting ring lip is present at the side of the metal sheet from which the functional element is inserted, which likewise facilitates the alignment of the functional element with the sheet metal part.

It is particularly favorable with the present invention that the guide section of the functional element can be formed as a piercing section, with the functional element being able to be introduced in self piercing manner into the sheet metal part so that a pre-holing is not necessary at all and the requirements placed on the alignment of the functional element with the sheet metal part are even lower. Through the self-piercing design of the functional element favorably priced manufacture of the component assembly is achieved, since the operation of pre-holing the sheet metal part is omitted. In this way the method of attachment of the functional element to the sheet metal part is also simplified.

At this point reference should briefly be made to DE-C-3446978 and DE-C-3447006. DE-C-3446978 describes, amongst other things, a nut element which is introduced in self-piercing manner into a sheet metal part whereas DE-C-3447006 discloses a similarly conceived bolt element. Neither the nut element nor the bolt element in accordance with the above-named German patents has a guide section in addition to the rivet section, so that the rivet section must execute both the piercing function and also the riveting function, which is ultimately more complicated and places stricter requirements on the rivet section and on the die than is used that is the case for the present invention.

It is particularly preferred when the free end of the wall of the ring-like rivet section, when viewed in an axial section plane, is rounded both at the radially outer side and also at the radially inner side and has for example a semi-circular shape or a shape resembling an arrow tip.

As already indicated the guide section of the functional elements leads, on attachment of the functional elements to a sheet metal part, to a conical recess in the sheet metal part and indeed, with a preholed sheet metal part, during the dilation of the hole by the guide section and, with a self-piercing embodiment of the functional element, priori to the cutting out of punching slug by the guide section forming a piercing section, with the conical recess then being dilated by the rivet section. The rounded design of the outer wall of the rivet section in the region of its free end is a favorable shape for the further dilation of the hole and the corresponding deformation of the conical wall of the recess. The rounded shape at the inner side of the free end of the rivet section helps in contrast by assisting the turning over of the rivet section which takes place in a corresponding, concavely arched, ring surface of the die. This shape also enables the ring gap to be kept as small as possible without impairing the process of the turning over of the rivet section. Since the ring gap can be kept as small as possible, and can indeed amount to 0 mm (which signifies that the inner wall of the rivet section contacts the outer circumference of the guide section), the diameter of the functional element as a whole can be kept as small as possible, whereby material can be saved and costs can be reduced.

The ring gap preferably has a radial dimension in the range between 0 mm and approximately 3 mm.

The ring gap preferably ends at an axial spacing from the ring-like contact surface at the rivet section side of the ring-like contact surface. This design leads to a stable attachment of the rivet section to the head part of the element and favors a firm attachment of the functional element to the sheet metal part.

When the guide section is formed as a piercing section it preferably has a ring-like cutting edge at its end face remote from the contact surface and this cutting edge cooperates with a correspondingly shaped cutting edge of a central bore of a die in order to punch out a clean piercing slug from the sheet metal part during the attachment of the functional element to the sheet metal part.

It is particularly preferred when features providing security against rotation are provided in the region of the ring-like contact surface and/or at the rivet section and/or at the jacket surface of the head part adjacent to the contact surface. When the features providing security against rotation are provided in the region of the jacket surface of the head part then these can be produced by a polygonal or grooved shape of the jacket surface. The features providing security against rotation in the region of the ring-like contact surface and/or at the rivet section and optionally at the jacket surface can be formed by noses or by groove-like recesses.

When noses provided security against rotation are provided these can be present in raised form at the contact surface and at the rivet section in the region of the transition from the contact surface into the rivet section.

The functional element can be present as a hollow element, for example with a cylindrical recess for a rotatively journalled shaft or for a thread cutting or thread forming screw, or as a latch recess for the pin of a clip or other article.

Moreover, the functional element can be formed as a nut element, i.e. the functional element has a thread cylinder which can be provided either in the head part or in the guide section, or at least partly in the head part and in the guide section. The functional element can, moreover, have a cylindrical bearing surface at the outer side of the guide section and it can also be realized as a bolt element.

BRIEF DESCRIPTION OF THE DRAWINGS

The invention will now be explained in the following in more detail with reference to embodiments and to the drawings which show.

DETAILED DESCRIPTION OF THE INVENTION

Figure 1:
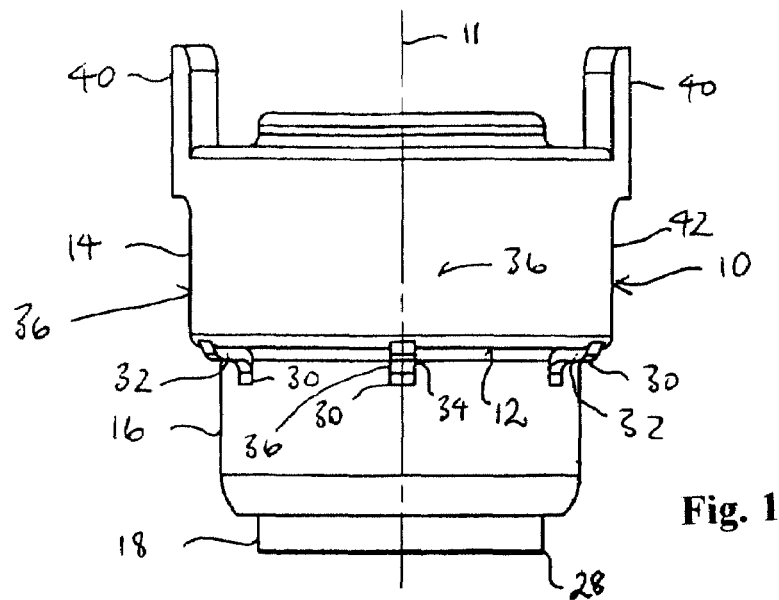
FIG. 1 a side view of a functional element in accordance with the invention in the form of a hollow body element, FIG. 2 a plan view on the upper end face of the functional element of FIG. 1, FIG. 3 a perspective representation of the functional element of the FIGS. 1 and 2, FIG. 4 a representation of the functional element of FIG. 1 to 3 which is partly sectioned in the longitudinal direction and in the initial stage of the attachment of the functional element to a sheet metal part using a die, FIG. 5 a representation similar to FIG. 4 but at a later face of the attachment of the functional element to the sheet metal part, FIG. 6 a representation similar to FIG. 5 but at a later stage of the attachment of the functional element to a sheet metal part, FIG. 7 a representation similar to FIG. 6 after completion of the attachment of a function element to the sheet metal, FIG. 8 the component assembly of FIG. 7 after the removal from the tool for the manufacture of the component assembly, FIG. 9 a representation similar to that of FIG. 4 showing the attachment of the functional element to a pre-holed sheet metal part, FIG. 10 a representation similar to that of FIG. 5 showing the attachment of the functional element to a pre-holed sheet metal part, FIG. 11 a representation similar to that of FIG. 6 showing the attachment of the functional element to a pre-holed sheet metal part, FIG. 12 a representation similar to that of FIG. 7 showing the attachment of the functional element to a pre-holed sheet metal part and FIG. 13 a representation of a pre-holed sheet metal part having a conical formation.

With reference to the FIGS. 1 to 4 the functional element 10 shown there is provided with a head part 14 having a ring-like contact surface 12 and a tubular rivet section 16 provided at the side of the contact surface 12 of the head part 14 and extending away from the head part 14. The functional element has a central longitudinal axis 11.

Figure 4:
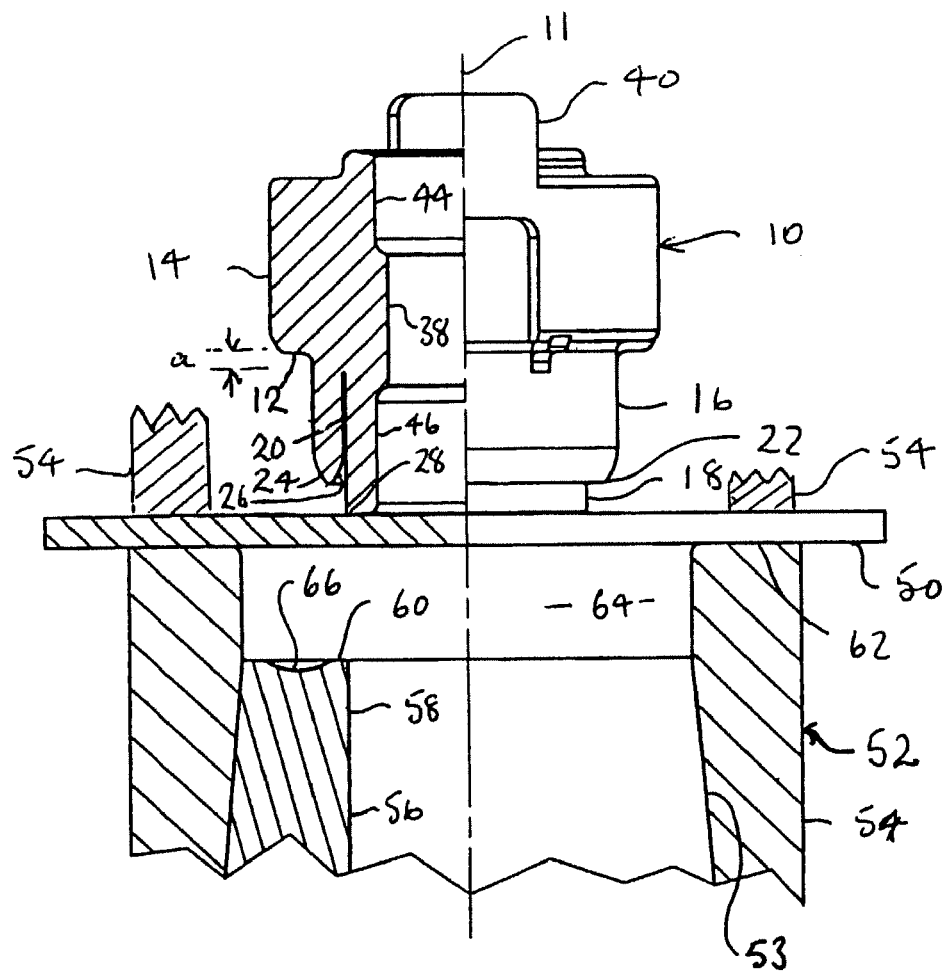

A tubular guide section 18 is arranged concentric to the tubular rivet section 16 and radially within the latter, with a ring gap 20, which is only evident from FIG. 4, being provided between the guide section 18 and the rivet section 16.

As likewise evident from FIG. 4 the free end 22 of the wall of the ring-like rivet section 16 is rounded when seen in the axial section plane of FIG. 4, both at the radially outer side 24 and also at the radially inner side 26 and has here a rounded shape resembling an arrow tip. The tip of the shape resembling an arrow tip could however likewise be rounded, whereby a semicircular shape would result, which is however not shown.

In the representation of FIG. 4 the ring gap has a radial dimension of 0 mm, i.e. the rivet section contacts the guide section 18, is however first connected to the guide section 18 where the ring gap 20 finishes at a short axial distance "a" in front of the ring-like contact surface 12.

The functional element of FIGS. 1 to 4 is normally manufactured by a cold heading process, the basic principles of which are well known. For the manufacture of the rivet section, which closely contacts the guide section, it can be necessary to first manufacture the rivet section with a certain radial spacing from the guide section by cold heading and to subsequently press the rivet section against the guide section in a further face of the cold heading process, or to dilate the guide section until it contacts the rivet section, or to achieve the reduction of radial spacing by a combination of both measures. It is favorable when the ring gap 20 has the smallest possible radial width since this leads to a compact design of the functional element and saves material.

The guide section 18 is formed here as a piercing section and has a ring-like cutting edge 28 at its end face remote from the contact surface 12, i.e. at its free end.

FIGS. 1 to 4 furthermore show features 30 providing security against rotation in the region of the ring-like contact surface 12 and at the rivet section 16, with the features providing security against rotation being formed here by noses which are present in raised form at the contact surface 12 and at the rivet section 16 in the region of the transition from the contact surface into the rivet section 16. The noses providing security against rotation shown here are provided with side flanks 30 and 32 which lie in planes extending in the longitudinal direction of the element. The noses providing security against rotation, which have sharp edges in FIGS. 1 and 4 at 34 and 36, can instead be provided with rounded edges. The noses providing security against rotation can also be realized by recesses in the contact surface or in the rivet section. The possibility also exists of providing the jacket surface 36 of the head part 14 with a polygonal or grooved shape. The functional element is realized here as a nut element and has a thread cylinder 38 which is arranged coaxial to the longitudinal axis 11 of the functional element and in this example is present partly in the guide section 18. A further special feature of the nut element of FIGS. 1 to 4 is to be seen in the two lugs 40 which project out from the upper end face of the element 10 and which are produced in that material is displaced upwardly from the regions 42 during the cold heading process so that corresponding recesses arise at the points 42, with the designation "upwardly" to be understood only in regard to the representation of FIG. 1 and, as other descriptions of position in this application, is only used in relation to the Figures, and does not represent any spatial restriction of the subject of the invention. The lugs 40 ensure that a cable shoe can be secured on the functional element by means of a screw inserted from above without the cable shoe being rotated with the screw during the attachment of the screw, since a co-rotation of the cable shoe is prevented by the lugs 40. As is in particular evident from FIG. 4 the functional element 10 has cylindrical recesses 44 and 46 above and below the thread cylinder 38, with these free spaces having a diameter which is normally made fractionally larger than the outer diameter of a screw which is screwed into the thread cylinder 38.

Although the thread cylinder 38 is present here partly in the head 10 part 14 and partly in the guide section 18 of the functional element it could also be arranged fully in the head part or fully in the guide section.

FIG. 4 shows the functional element 10 in a first stage of the attachment to the sheet metal part, with the sheet metal part 50 being supported in the representation of the FIG. 4 on a die 52 and being pressed against the die 52 by means of a ring-like hold-down member 54, with the hold-down member 54 preferably being provided but not being essential.

The representation of FIG. 4 assumes that the attachment of the functional element to the sheet metal part 50 takes place in a press, with the die being arranged in the lower tool of the press (not shown) and the functional element 10 being pressed by means of a likewise not illustrated setting head onto the sheet metal part 50, with it being possible for the setting head to be attached to an intermediate plate of the press or to an upper tool of the press. Such setting heads and hold-down members 54 are extremely well known in the prior art and are thus not especially described here. It should however also be brought to expression that other arrangements within a press are possible. For example, the die 52 can be arranged in an intermediate plate of the press, with the setting head with or without a hold-down member then being attached to the upper tool of the press. It is also possible to provide the die 52 at the upper tool of the press and to then attach the setting head with or without a hold-down member on an intermediate plate of the press or on the lower tool of the press, i.e. to attach the functional element 10 in the inverse direction beneath the sheet metal part 50.

It is also entirely possible to attach the functional element 10 to the sheet metal part 50 by a robot, with the robot or an auxiliary robot then holding the die 52 beneath the sheet metal part and serving for the application of the pressing force onto the functional element 10 which is required for the attachment.

In FIG. 4 a two-part design of the die 52 is shown. This consists of an outer ring-like die part 54 and an inner likewise ring-like die part 56 with a central longitudinal bore 58. In this example the inner die part 56 has a slightly conically extending outer wall which cooperates with a correspondingly shaped conically extending inner wall 53 of the outer die part 54 so that the upper end face 60 of the inner die part 56 comes to lie below the upper end face 62 of the outer die part 54 and hereby forms a recess 64. The upper end 60 of the inner die part 56 thus forms the base surface of the recess 64 and has in other respects a ring-like, concavely arched surface 66. The central bore 58 of the central die part 56 has a diameter which is fractionally larger than the outer diameter of the guide section 18. The recess 64 has a diameter which is somewhat larger than the outer diameter of the head part 14 of the functional element 10 plus twice the thickness of the sheet metal part 50.

Both the inner die part 56 and also its bore 58 and also the outer die part 54 and the recess 64 defined between the two die parts are arranged coaxial to the central longitudinal axis 11 of the functional element 10. The die 52 could also be formed in one piece.

Figure 5:
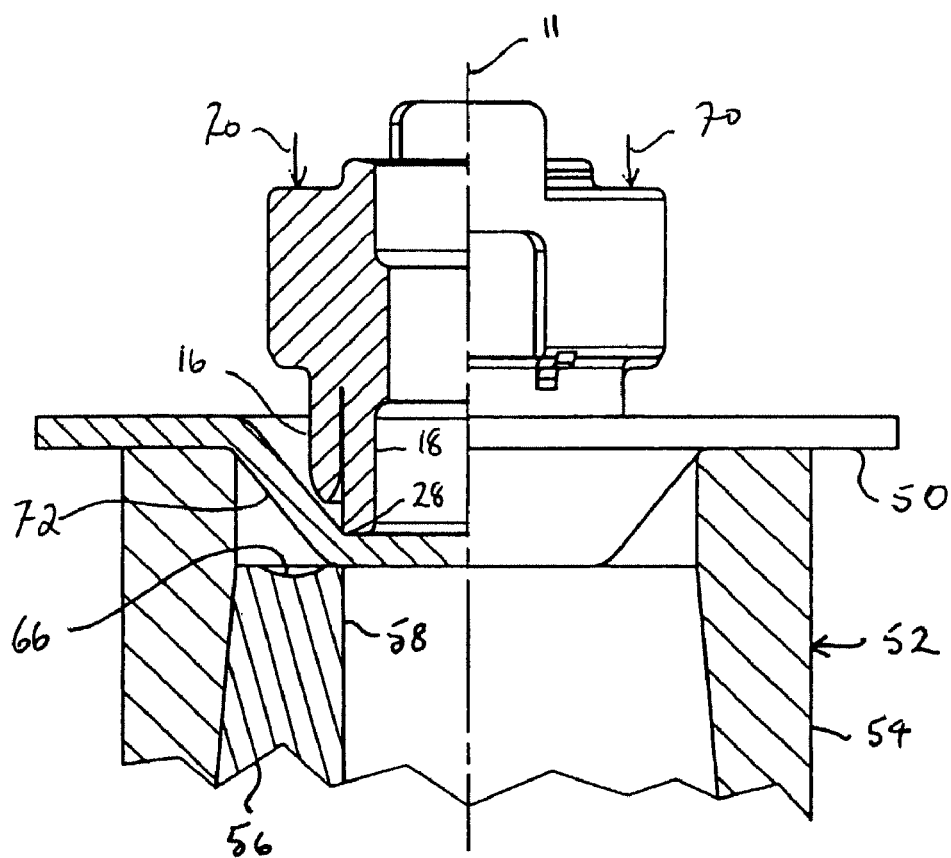

Starting from the stage of FIG. 4 the functional element 10 is now pressed against the sheet metal part 50 in accordance with FIG. 5 by the application of a force in the direction of the arrow 70 onto the upper end face of the functional element 10 by means of the setting head, for example in the press, or by using a robot and with simultaneous support of the die, with the optionally provided hold-down member 54 having been omitted in FIG. 5 for the sake of the illustration.

One sees that the guide section presses the sheet metal part against the upper end face 60 of the inner die part 56 and has drawn the metal sheet into a conically extending recess 72. At this stage the ring-like cutting edge 28 of the guide section which is formed as a piercing section 18 has not yet started to cut through the sheet metal part 50 and the free lower end 22 of the rivet section 16 has not yet contacted the sheet metal part 50.

Figure 6:
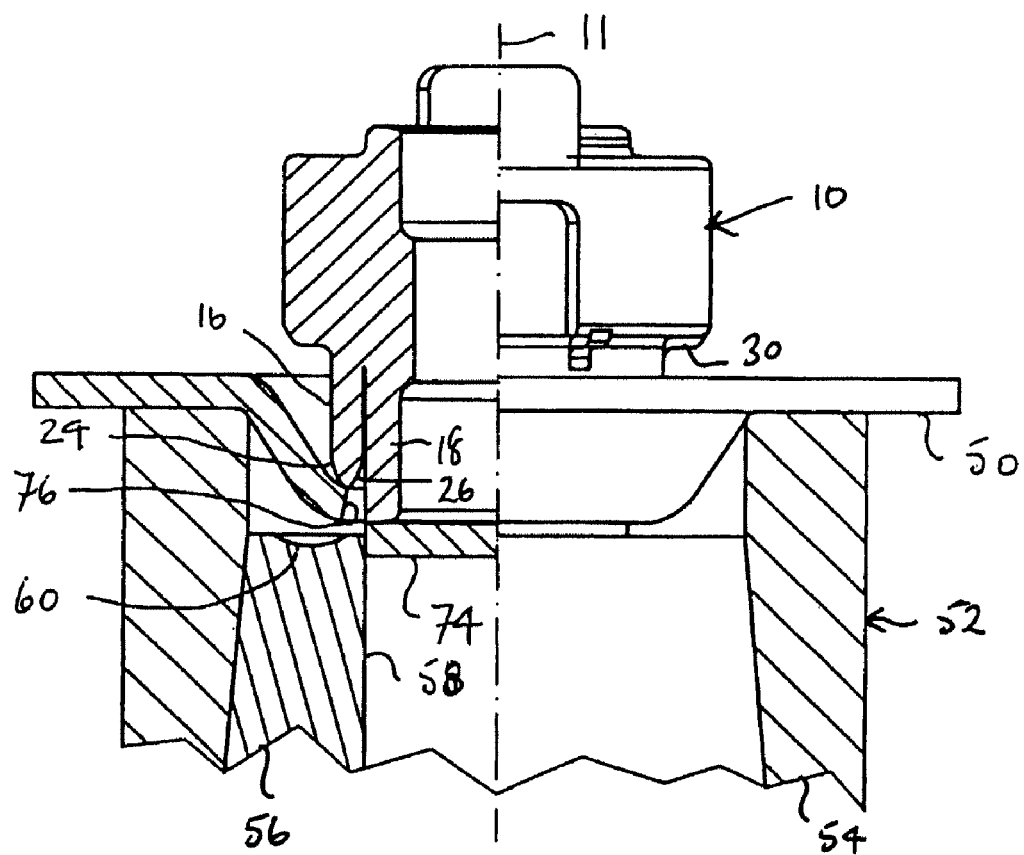

In the further stage of FIG. 6 the guide section 18 has cut out a piercing slug 74 from the base of the conical recess of the sheet metal part and has partly pressed the latter through the central bore 58 of the die, with it being possible for this central bore 58 to be formed so that it also diverges slightly downwardly, so that the piercing slug can be disposed off via this central longitudinal bore by gravity, optionally with pneumatic assistance.

Figure 7:
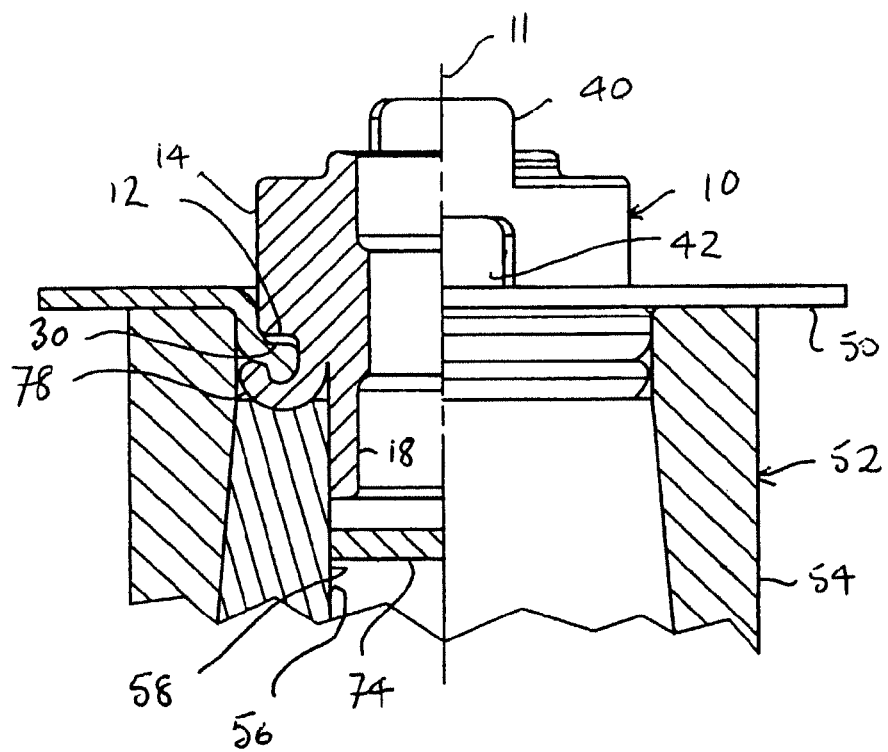

After the separating out of the piercing slug the rounded outer wall 64 at the free end of the rivet section 16 has also pressed the wall of the conical recess of the sheet metal part 50 away from the central longitudinal axis 11, i.e. brought the wall into a somewhat steeper position and dilated the hole 76, which has arisen by the cutting out of the piercing slug 74, to such an extent that the free end of the rivet section 16 can now be pressed through the hole 76, so that the inner curved wall 26 of the free end of the rivet section can be brought into contact with the ring-like recess 66, whereby, during a further downwardly directed movement of the functional element as a result of the pressure in the direction of the arrow 70, the tubular rivet section 16 is turned over to form a rivet bead 78 in accordance with FIG. 7. Through this turning over (or riveting) process the sheet metal part 50 is so deformed in the region of the previous conical recess that it is clamped in form-fitted manner between the ring-like contact surface 12 and the turned over rivet section. At the same time the noses 30 providing security against rotation are pressed into the sheet material so that a corresponding security against rotation also arises. When the features providing security against rotation are formed by corresponding recesses then the sheet material is pressed into such recesses whereby a security against rotation likewise arises.

The sheet material is however simultaneously partly pressed into the recesses 42 which have arisen through the formation of the lugs 40 so that a security against rotation also arises in this region. Should the head part 14 with the functional element 10 have a polygonal or grooved or ribbed shape, then a corresponding form-fitted connection between the sheet metal part and the functional element is also produced in this region.

One can see from FIG. 7 that the guide section 18 enters ever deeper into a central bore 58 of the inner die 56 during the attachment of the functional element 10, whereby a reliable guidance of the functional element is achieved.

Figure 8:
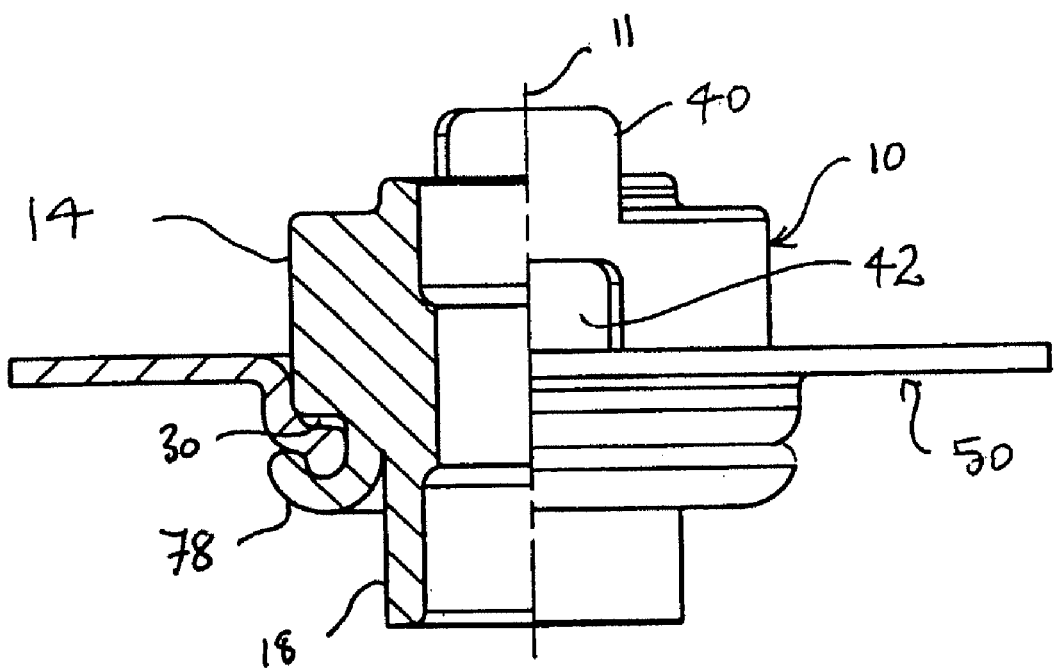

The finished component assembly consisting of the functional element 10 and the sheet metal part 50 is then shown in FIG. 8 after the removal out of the attachment tooling, i.e. out of the press or out of the robot or out of attachment tools which are conceived differently.

One can see that the guide section projects significantly beyond the turned over rivet section 16 and it is thus possible to subsequently use this guide section as a cylindrical bearing surface. This likewise applies to the jacket surface of the head part 14 which projects out of the sheet metal part 50 at the other side of the sheet metal part. It is in other respects also possible to dimension the arrangement such that the body part 14 is accommodated still further within the recess in the sheet metal part or indeed fully within this recess. In the finished state in accordance with FIG. 8 a further component, i.e. another sheet metal part or a cable shoe can be secured either to the upper end face of the functional element or to the lower end face of FIG. 8, i.e. the corresponding screw can be introduced into the thread cylinder coming from above or from below. It would be possible to attach components both at the bottom and also at the top. Furthermore, both the guide section 18 and also the head part 14 can act as a spacer element, so that the element can be introduced into a hollow component consisting of two sheet metal parts. However it would here probably be necessary to pre-hole the component 50, which is basically also possible and indeed also when the sheet metal part is on its own, i.e. is not assembled to a further sheet metal part to form a hollow component. The lugs 40 are only optionally provided and indeed in particular when the element is to be used as an electrical connection element, for example as a earth connection element in a vehicle body.

Figure 2:
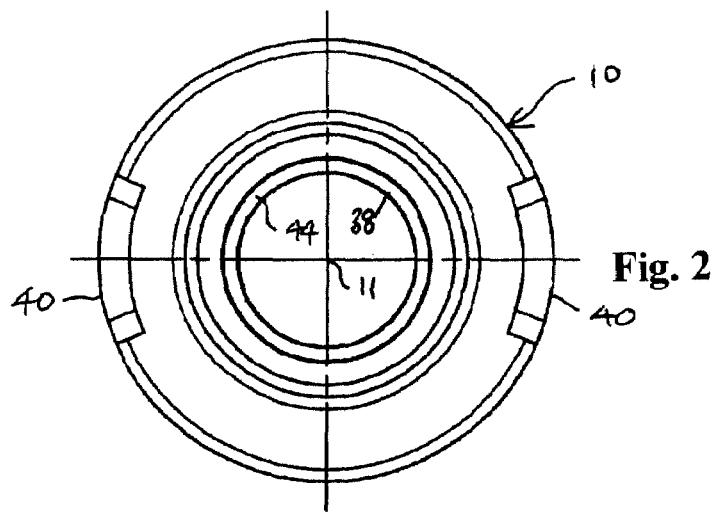
Figure 3:
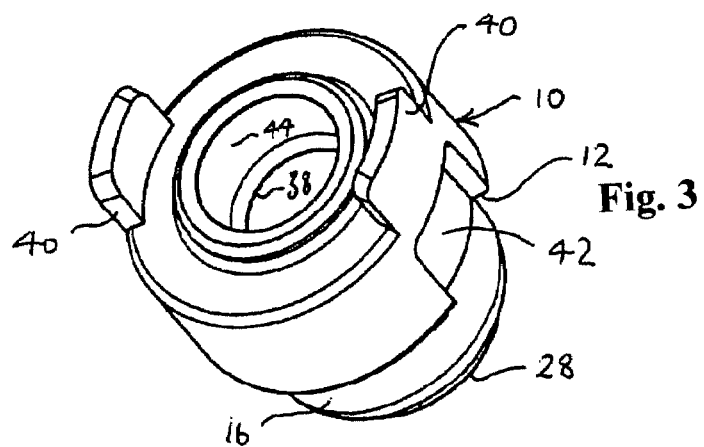
Figure 9:
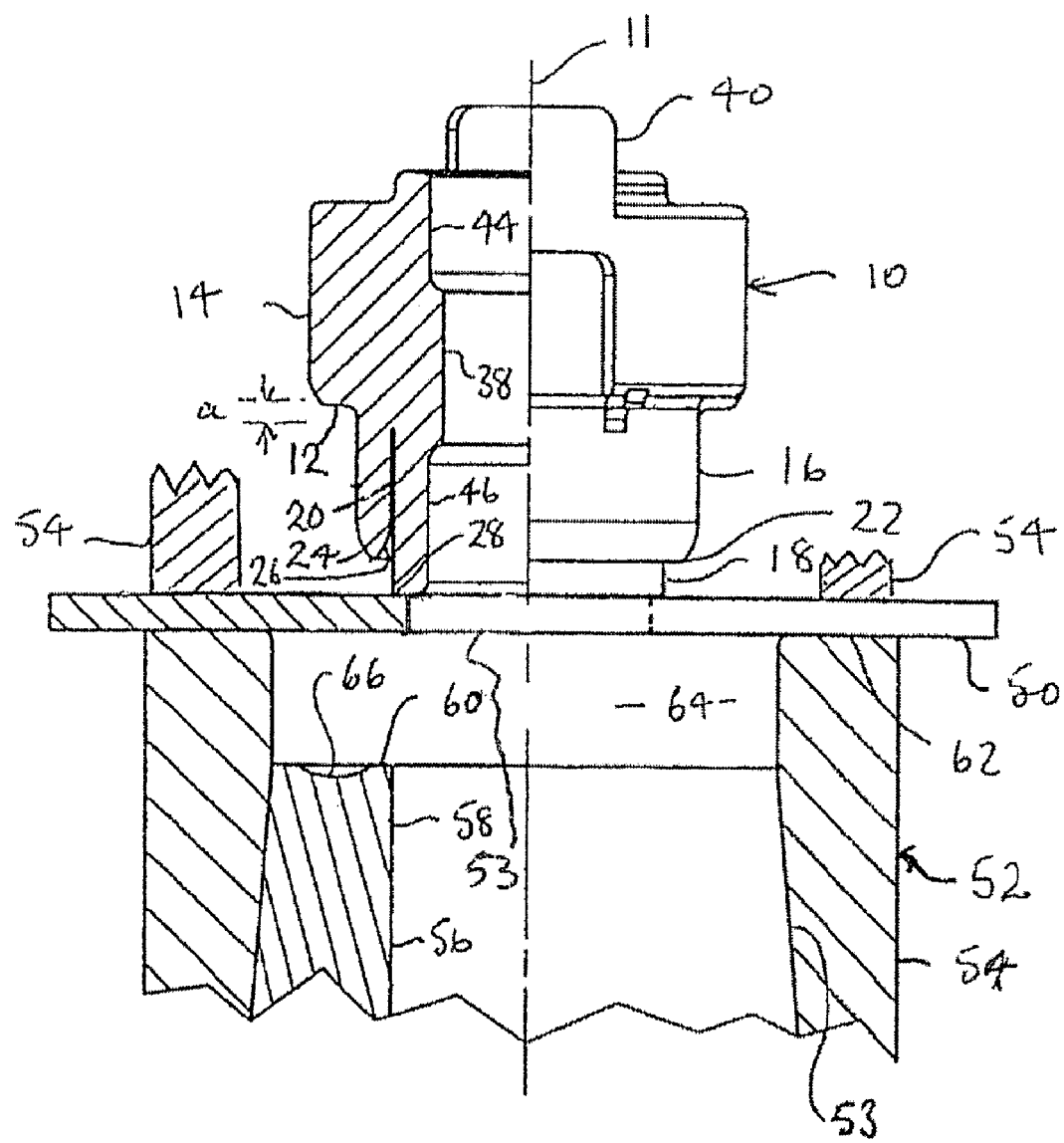

FIG. 9 shows the functional element 10 discussed in FIGS. 1 to 3 which is partly sectioned in the longitudinal direction and with the functional element 10 being in the initial stage of attachment to a pre-holed sheet metal part 50 having a hole 53.

Figure 10:
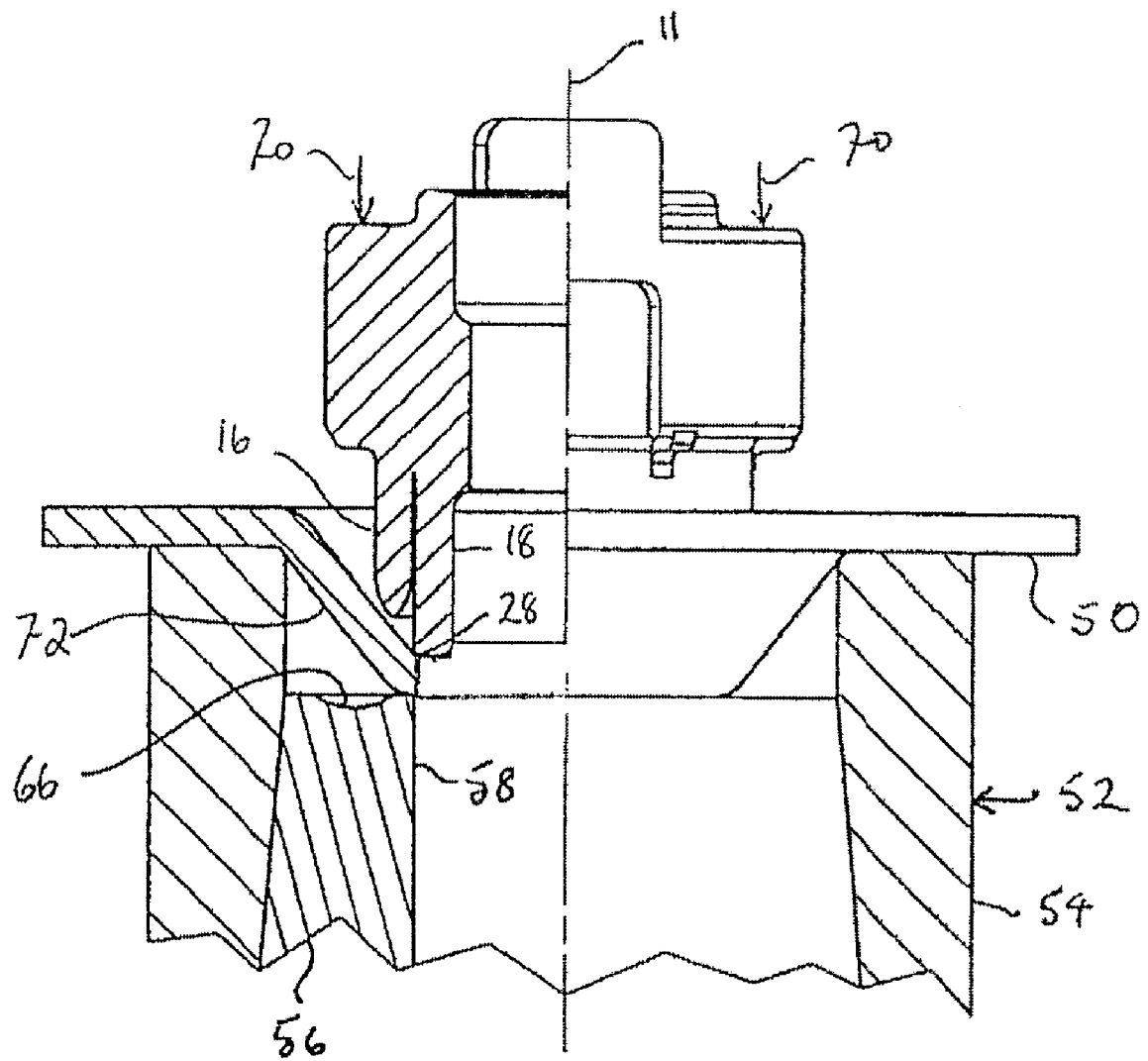
Figure 11:
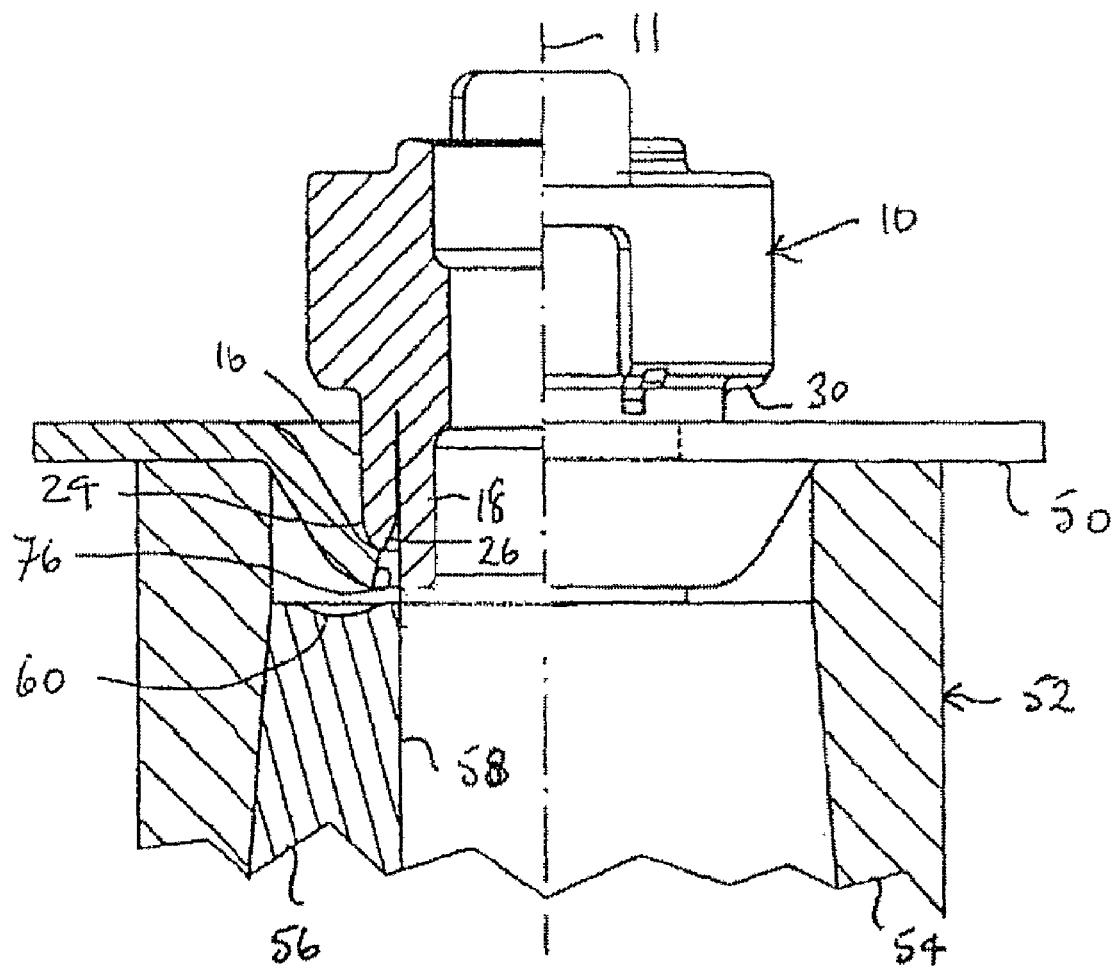

FIGS. 10 to 12 show the same attachment stages as those discussed in relation to FIGS. 5 to 7, with the functional element 10 now being attached to a pre-holed sheet metal part 50.

FIG. 13 shows a pre-holed sheet metal part 50 having a hole 53 and a conical formation 51.

The functional element 10 in accordance with the present invention has the special advantage that it can also be used with sheet metal parts 50 provided with protective layers or paint layers and nevertheless generates an excellent electrical connection, and indeed in the region of the pierced hole, with the noses providing security against rotation which locally cut through the protective coating, especially with a sharp edged design of the noses providing security against rotation and serving for a metallic connection to the sheet metal part 50. Moreover, the protective layer is damaged at points which lie within the form-fit between the sheet metal part 50 and the functional element so that a seal takes place there and corrosion is prevented. The form-fitted connection between the sheet metal part and the functional element is so intensive that the connection represents a sealed connection which, when a special seal is required, can also be assisted by the application of an adhesive to the element of the sheet metal part. Through the recess of the sheet metal part 50 in the region of the functional element an excellent connection to the sheet metal part is ensured, so that a high resistance against pullout forces in both directions is generated and, moreover, a high resistance against shear forces and torsional forces is present. In addition the element can be used with alternating dynamic loadings and fatigue effects with dynamic loadings are not to be feared.

The functional elements described here can for example be manufactured from all materials which reach the strength class 5.6 or higher. Such metal materials are normally carbon steels with 0.15 to 0.55% carbon content.

In all embodiments all materials can be named as an example for the material of the functional elements which achieve the strength values of class 8 in accordance with the ISO standard in the context of cold deformation, for example a 35B2 alloy in accordance with DIN 1654. The so formed fastening elements are suitable, amongst other things, for all commercially available steel materials for drawing quality sheet metal parts as well as for aluminium or its alloys. Aluminium alloys, in particular those of higher strength, can be used for the functional elements, for example AlMg5. Moreover, functional elements of higher strength magnesium alloys such as, for example, AM5O can also be considered.

The invention claimed is:

1. A method for the attachment of a functional element to a pre-holed sheet metal part having a hole, wherein the functional element is provided with a head part having an annular contact surface and a tubular rivet section extending generally from the head part adjacent the annular contact surface away from the head part, said rivet section having a free end and a rounded end region, wherein a tubular guide section is arranged concentric to the tubular rivet section said tubular guide section having a free end face and being radially within said rivet section, wherein a ring gap is provided between the guide section and the rivet section and wherein the guide section projects beyond the free end of the rivet section, wherein the pre-holed sheet metal part is supported on a die having a central longitudinal axis, a ring surface, an annular recess within the ring surface, a base region within the annular recess and a central bore which lies at least substantially coaxial to the recess inside the base region with the diameter of the central bore being only fractionally larger than the outer diameter of the guide section and the recess having a diameter which corresponds at least substantially to the outer diameter of the head part of the functional element plus twice the sheet metal thickness, wherein the free end face of the guide section of the functional element is pressed, coaxial to the longitudinal axis of the central bore of the die and to the hole of the pre-holed sheet metal part, onto the sheet metal part and the sheet metal part is drawn by means of the free end face of the guide section into a conical formation within the recess, said conical formation having a ring wall, wherein the ring wall of the conical formation is pressed with the rounded end region of the rivet section away from the central longitudinal axis of the die and into a steeper position while the guide section is guided by the central bore of the die and wherein the rivet section is turned over radially outwardly via a ring surface, which is concavely rounded in cross-section, the base region of the recess of the die around the ring wall of the conical formation in order to trap sheet metal material between the annular contact surface and the turned over rivet section of the functional element in form-fitted matter with simultaneous deformation of the sheet material into a form fit with any features of the functional element providing security against rotation.

2. The method according to claim 1, wherein, if a conically pre-holed sheet metal part is provided, said conical formation is broadened in the region of the hole, and wherein said ring wall of the conical formation is pressed with the rounded end region of the rivet section away from the central longitudinal axis of the die.

3. A method for the attachment of a functional element to a sheet metal part, wherein the functional element is provided with a head part having an annular contact surface and a tubular rivet section having a free end and a rounded end region extending generally from the head part adjacent the annular contact surface away from the head part wherein a tubular guide section having an end face is arranged concentric to the tubular rivet section and being radially within said rivet section, wherein a ring gap is provided between the guide section and the rivet section and wherein the guide section projects beyond the free end of the rivet section wherein the sheet metal part is supported on a die having an annular recess with a base region and a central bore having a longitudinal axis which lies at least substantially coaxial to the recess with the diameter of the central bore being only fractionally larger than the outer diameter of the guide section and the recess having a diameter which corresponds at least substantially to the outer diameter of the head part of the functional element plus twice the sheet metal thickness, wherein the end face of the guide section of the functional element is pressed, coaxial to the longitudinal axis of the central bore of the die, onto the sheet metal part and the sheet metal part is drawn by means of the end face of the guide section into a conical formation within the recess, said conical formation having a ring wall, wherein a slug is cut out of the sheet metal part by the guide section which is formed as a piercing section, and the slug is disposed of via the central bore of the die, wherein the ring wall of the conical formation is pressed with the rounded end region of the rivet section away from the central longitudinal axis of the die and into a steeper position while the guide section is guided by the central bore of the die and wherein the rivet section is turned over radially outwardly via a ring surface, which is concavely rounded in cross-section, in the base region of the recess of the die around the ring wall of the conical formation in order to trap the sheet metal material between the annular contact surface and the turned over rivet section of the functional element in form-fitted matter with simultaneous deformation of the sheet material into a form fit with any features of the functional element providing security against rotation.

* * * * *